(12) United States Patent
Gaertner et al.

(10) Patent No.: US 10,648,500 B2
(45) Date of Patent: May 12, 2020

(54) BLIND RIVET NUT

(71) Applicant: GESIPA Blindniettechnik GmbH, Moerfelden-Walldorf (DE)

(72) Inventors: Richard Gaertner, Griesheim (DE); Thomas Bamberger, Kelkheim (DE); Sandro Setzer, Frankfurt (DE); Alexander Schulz, Friedrichsdorf (DE)

(73) Assignee: GESIPA BLINDNIETTECHNIK GMBH, Moerfelden-Walldorf (DE)

( * ) Notice: Subject to any disclaimer, the term of this patent is extended or adjusted under 35 U.S.C. 154(b) by 176 days.

(21) Appl. No.: 15/787,213

(22) Filed: Oct. 18, 2017

(65) Prior Publication Data
US 2018/0112702 A1 Apr. 26, 2018

(30) Foreign Application Priority Data
Oct. 26, 2016 (EP) .................................... 16195729

(51) Int. Cl.
  *F16B 37/06* (2006.01)
  *F16B 33/02* (2006.01)

(52) U.S. Cl.
  CPC ............ *F16B 37/067* (2013.01); *F16B 33/02* (2013.01); *F16B 37/06* (2013.01)

(58) Field of Classification Search
  CPC .... F16B 19/1072; F16B 33/02; F16B 37/067; F16B 37/06; Y10T 29/49943
  USPC ........ 411/55, 60.2–60.3, 172, 178, 183, 500, 411/501
  See application file for complete search history.

(56) References Cited

U.S. PATENT DOCUMENTS

| 2,255,650 | A | * | 9/1941 | Burke | ................... | F16B 37/043 |
| | | | | | | 411/44 |
| 2,392,133 | A | * | 1/1946 | Eklund | ................ | F16B 37/067 |
| | | | | | | 411/34 |
| 2,763,314 | A | * | 9/1956 | Gill | ........................ | F16B 33/002 |
| | | | | | | 29/509 |
| 2,896,495 | A | * | 7/1959 | Crawford | .............. | F16B 37/002 |
| | | | | | | 411/437 |
| 3,030,705 | A | * | 4/1962 | Gill | ..................... | B25B 27/0007 |
| | | | | | | 29/512 |
| 3,304,830 | A | * | 2/1967 | Shackelford | ........ | B25B 27/0007 |
| | | | | | | 29/524.1 |

(Continued)

FOREIGN PATENT DOCUMENTS

CH 447 996 12/1967
DE 12 84 168 11/1968

(Continued)

OTHER PUBLICATIONS

Europe Search Report/Office Action conducted in Europe Appln. No. 161 95 729.5-1760 (May 4, 2017) (w/ Partial English Language Translation).

(Continued)

*Primary Examiner* — Roberta S Delisle
(74) *Attorney, Agent, or Firm* — Greenblum & Bernstein, P.L.C.

(57) ABSTRACT

A blind rivet nut includes a rivet sleeve having a set head, a deformation region for forming the closing head, and a threaded section having a female thread. The female thread comprises maximally four complete thread turns, which produces a blind rivet nut with a low mass.

19 Claims, 3 Drawing Sheets

(56) References Cited

U.S. PATENT DOCUMENTS

| | | | |
|---|---|---|---|
| 3,461,771 A * | 8/1969 | Briles | F16B 19/1054 411/34 |
| 3,463,046 A | 8/1969 | Welch et al. | |
| 3,750,525 A * | 8/1973 | Waters | F16B 19/008 411/34 |
| 3,789,728 A * | 2/1974 | Shackelford | F16B 37/067 411/34 |
| 3,797,358 A * | 3/1974 | Allender | F16B 13/061 411/38 |
| 5,051,048 A * | 9/1991 | Maddox | F16B 19/1072 411/34 |
| 6,761,520 B1 * | 7/2004 | Dise | F16B 33/002 411/113 |
| 7,223,056 B2 * | 5/2007 | Schneider | F16B 37/067 411/183 |
| 8,936,422 B2 * | 1/2015 | Makino | F16B 37/067 411/183 |
| 9,366,283 B2 | 6/2016 | Boerner et al. | |
| 2006/0291974 A1 * | 12/2006 | McGee | B25B 27/0014 411/171 |
| 2011/0311334 A1 * | 12/2011 | Making | C21D 1/20 411/427 |

FOREIGN PATENT DOCUMENTS

| | | |
|---|---|---|
| EP | 1 953 398 | 8/2008 |
| EP | 2 792 892 | 10/2014 |
| EP | 2 947 336 | 11/2015 |
| FR | 737 284 | 12/1932 |

OTHER PUBLICATIONS

Europe Notice of Opposition in counterpart Europe Appln. No. 16195729.5 (EP 3,315,799 B1) (Sep. 17, 2019).

* cited by examiner

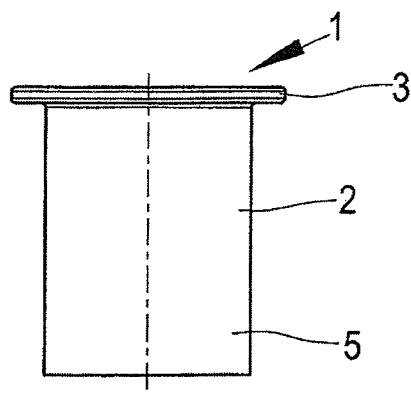 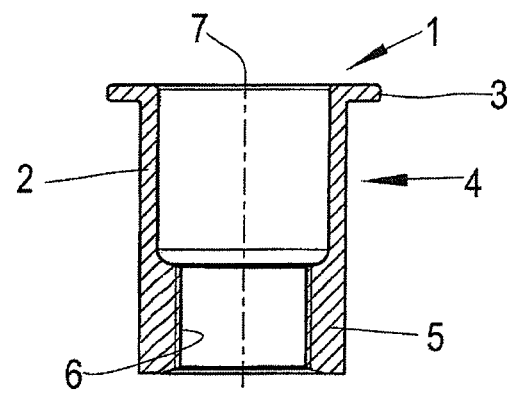
Fig. 1a  Fig. 1b
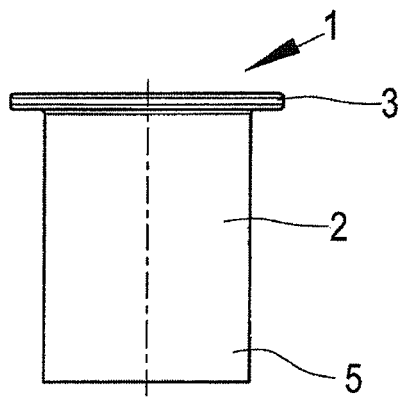 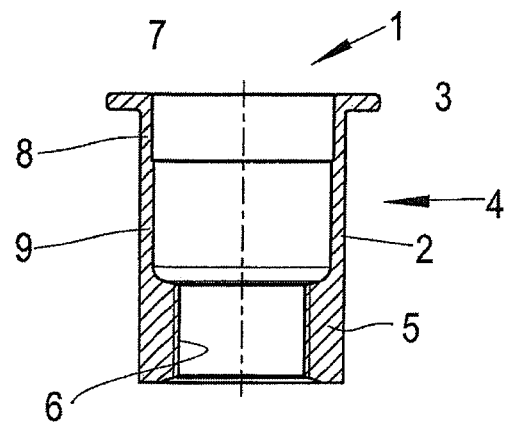
Fig. 2a  Fig. 2b
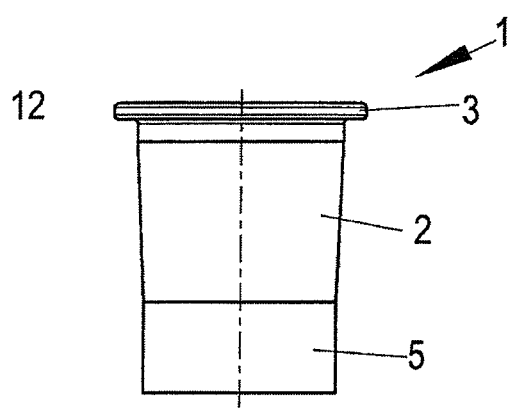 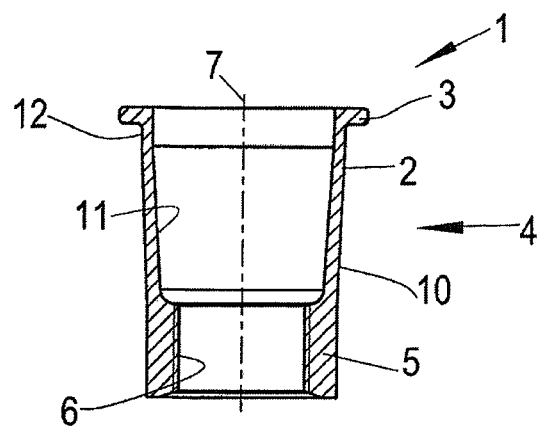
Fig. 3a  Fig. 3b

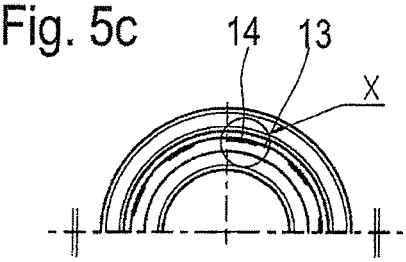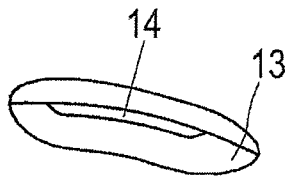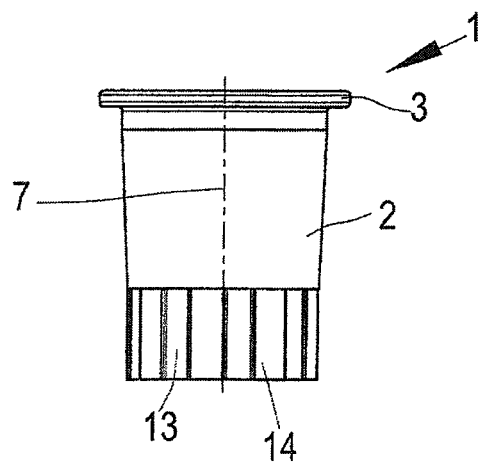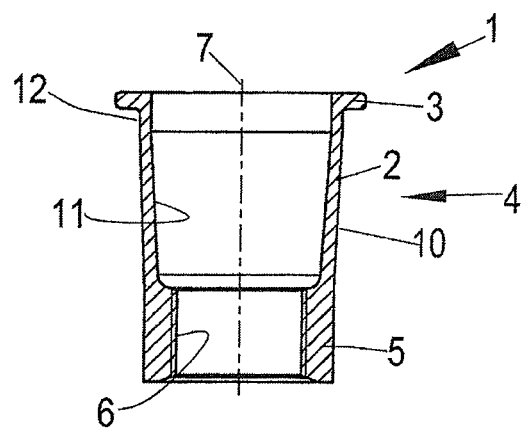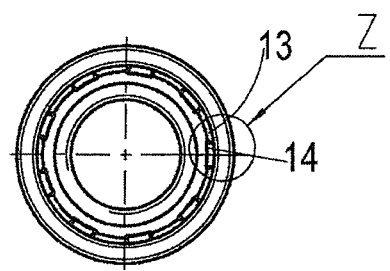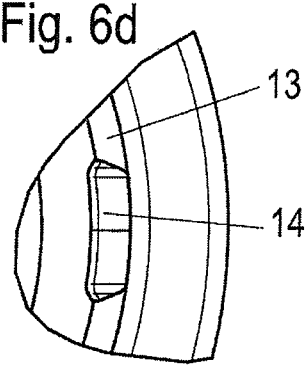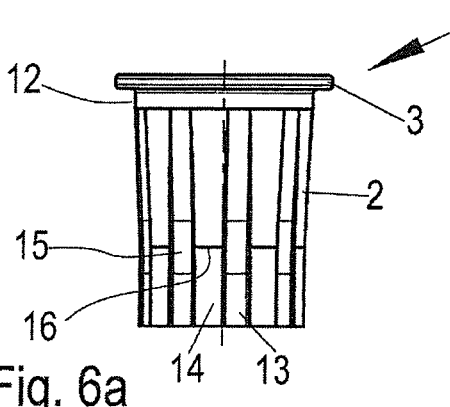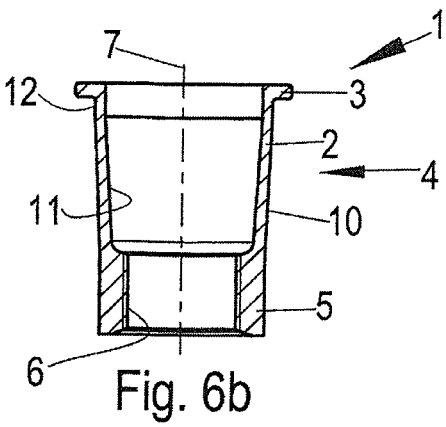

BLIND RIVET NUT

CROSS-REFERENCE TO RELATED APPLICATIONS

The present application claims priority under 35 U.S.C. § 119 of European Patent Application No. 16 195 729.5, filed Oct. 26, 2016, the disclosure of which is expressly incorporated by reference herein in its entirety.

BACKGROUND

1. Field of the Invention

Embodiments are directed to a blind rivet nut having a rivet sleeve that comprises a set head, a deformation region for forming a closing head, and a threaded section having a female thread.

2. Discussion of Background Information

A rivet nut of this type is used to install a thread in a component. A blind rivet nut is readily used in particular where it is not possible to create a thread in the component in any other way, for example, because the material thickness of the component is too small. In addition, it is also possible to connect two or more structural elements to one another during the setting of the blind rivet nut.

To set a blind rivet nut, the blind rivet nut is inserted into a bore of the component until the set head bears against the component. A threaded mandrel is screwed into the female thread of the threaded section, and a pulling force is applied to the threaded mandrel so that the closing head forms on the "blind side" of the structural element.

For the formation of the closing head, the deformation region is deformed. It bulges outwards away from the pulling mandrel.

In some applications of blind rivet nuts of this type, it is desirable to minimize the weight or the mass of the blind rivet. Applications of this type are found, for example, in aircraft or vehicle construction.

SUMMARY

Embodiments of the invention are directed to a blind rivet nut with a small mass.

According to embodiments, a blind rivet nut of the type named at the outset includes a female thread that includes maximally four complete thread turns.

With an embodiment of this type, the female thread and thus also the threaded section can be kept relatively short, so that the mass of the threaded section can be minimized. The smaller the mass of the threaded section, the lower the mass of the blind rivet nut overall. It has become evident that four complete thread turns are easily adequate for most fastening tasks, since normally only the first three thread turns are critically load-bearing anyway. In a preferred embodiment, it is even provided that the female thread comprises maximally three complete thread turns.

Preferably, the set head and/or the deformation region transformed into the closing head have a relative strength that is higher than a thread pull-out force of the female thread. The set head and the deformation region can be embodied to be relatively thin, which has the positive effect of a low mass.

In this case, it is particularly preferred that the relative strength is maximally 50% higher, in particular maximally 25% higher, than the thread pull-out force. The set head and/or the deformation region can therefore be extremely thin.

Preferably, the rivet sleeve comprises, at least in the region of the set head and/or the deformation region, a material for which the ratio between the elastic limit and the elongation at break is at least 10%, preferably at least 12%. The elastic limit, which is also referred to as the 0.2 percent offset yield strength or by the abbreviation $R_{p,0.2}$, is the mechanical stress at which the permanent elongation relative to the initial length of the sample is equal to 0.2% after the stress is removed. For the use of a material with the indicated ratio, a high-strength material is used with which the same mechanical properties can be attained with a smaller wall thickness than with previously known blind rivet nuts.

Preferably, the female thread has a pitch that differs from the pitch of a standard thread by at least 2%. The female thread thus comprises a "thread error" which, when a screw or a threaded bolt is screwed in, causes a tension to form between the male thread of the screw or threaded bolt and the female thread. It can thus be achieved that all thread turns of the female thread are to a great extent load-bearing, so that the forces in the female thread are distributed more uniformly and the threaded section thus needs to be designed for a lower maximum load.

Preferably, the rivet sleeve has at least two different wall thicknesses between the set head and the threaded section. A thinner wall thickness can be used to reduce the mass of the blind rivet nuts.

Here, it is preferred that the rivet sleeves have a smaller wall thickness adjacent to the set head than adjacent to the threaded section. During the setting of the blind rivet nut, a region which is adjacent to the set head is inserted at least partially into the item that is to be joined and is then stabilized radially outwards by the item that is to be joined. In this case, a relatively low wall thickness can be used without diminishing the capabilities of the blind rivet nut to bear a certain load.

Preferably, in a section between the set head and the threaded section, the rivet sleeve comprises an outer circumferential wall that tapers towards the threaded section. The cross-sectional area of the outer circumferential wall is thus larger in the vicinity of the set head than in the vicinity of the threaded section. It can thus be achieved that the threaded section has a small mass, since the threaded section can have a relatively small outer diameter. At the same time, it is possible to form a relatively large closing head with the blind rivet nut, so that the surface pressure between the closing head and the item that is to be joined can be minimized, which in turn enables the deformation region, which is ultimately used to form the closing head, to be embodied to be relatively thin, so that a small mass is also attained again here.

Preferably, in a section between the set head and the threaded section, the rivet sleeve comprises an inner circumferential wall that tapers towards the threaded section. The same thing applies in this case. The outer circumferential wall and the inner circumferential wall can be allowed to run parallel to one another so that a uniform wall thickness results.

However, it is preferred if the outer circumferential wall has a smaller angle to a thread axis of the female thread than does the inner circumferential wall. In this case, the wall thickness of the section becomes smaller towards the set head than towards the threaded section.

Preferably, at least one section of the rivet sleeve comprises on its inner and/or outer circumference a shape that deviates from a cylinder shape or cone shape. A deviation of this type can, for example, be formed in that the shape of the circumference is formed by a polygon or a wave shape or with ribs. In this manner, the strength of the threaded section is reinforced in a radial direction so that with adequate strength, only a small amount of material must be used for the threaded section. The section can be the deformation region, in which the deviating shape can be provided on the inner circumference or on the outer circumference, or on the inner circumference and the outer circumference. It can also be the threaded section, in which the deviating shape is expediently provided on the outer circumference.

Preferably, the deviating shape is provided on the threaded section and the deviating shape continues past the threaded section in the direction of the set head. It is thus possible to reduce material and thus mass not only in the threaded section, but also in the deformation section.

Preferably, the shape comprises protrusions and troughs that run parallel to the axis of the female thread. This facilitates production.

Preferably, the protrusions transition from the threaded section into the deformation section with a curve. Suitable transformation properties during the formation of the closing head can thus be achieved. In addition, production is designed in a simple manner using shaping.

Embodiments are directed to a blind rivet nut. The blind rivet nut includes a rivet sleeve having a set head, a deformation region for lining a closing head, and a threaded section having a female thread. The female thread includes maximally four complete thread turns.

According to embodiments, at least one of the set head and the deformation region, which has been transformed into the closing head, has a relative strength that can be greater than a thread pull-out force of the female thread. In accordance with other embodiments, the relative strength can be maximally 50% higher than the thread pull-out force. Further, in other embodiments, the relative strength may be maximally 25% higher than the thread pull-out force.

In other embodiments, the rivet sleeve, at least in a region of at least one of the set head and the deformation region, can be comprised of a material for which a ratio between an elastic limit and an elongation at break is at least 10%. In still other embodiments, the ratio between the elastic limit and the elongation at break may be at least 12%.

According to other embodiments, the female thread can have a pitch that differs from a pitch of a standard thread by at least 2%.

In still other embodiments, the rivet sleeve may have at least two different wall thicknesses between the set head and the threaded section. Moreover, a wall thickness of the rivet sleeve may be a smaller adjacent to the set head than adjacent to the threaded section.

In other embodiments of the invention, in a section between the set head and the threaded section, the rivet sleeve can include an outer circumferential wall that tapers towards the threaded section. Moreover, in a section between the set head and the threaded section, the rivet sleeve can include an inner circumferential wall that tapers towards the threaded section. In embodiments, the outer circumferential wall can have a smaller angle to an axis of the female thread than does the inner circumferential wall.

In further embodiments, the rivet sleeve may have an inner circumferential wall and an outer circumferential wall, and, at least one of the inner and outer circumferential wall can have a shape that deviates from a cylinder shape or cone shape. In embodiments, the deviating shape can be provided on the threaded section. In other embodiments, the deviating shape may be provided on the threaded section and the deviating shape can continue past the threaded section in the direction of the set head. Moreover, the shape may include protrusions and troughs that run parallel to an axis of the female thread. In embodiments, the protrusions can transition from the threaded section into the deformation section with a curve.

Embodiments are directed to a method forming a blind rivet nut that includes a rivet sleeve having a set head and a threaded section separated by a deformation region for forming a closing head. The method includes forming a female thread in the threaded section of the rivet sleeve having at most four complete thread turns.

According to embodiments, the method can include shaping at least one of at least a part of an inner circumferential wall of the rivet sleeve and at least a part of an outer surface of the rivet sleeve with protrusions and depressions extending parallel to a thread axis of the female thread.

In accordance with still yet other embodiments of the present invention, the method may include compressing a portion of an outer circumferential wall surrounding the threaded section to form protrusions and depressions running parallel to a thread axis of the female thread.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 1a and 1b show views of a first embodiment of a blind rivet nut;

FIGS. 2a and 2b show views of a second embodiment of a blind rivet nut;

FIGS. 3a and 3b show views of a third embodiment of a blind rivet nut;

FIGS. 5a, 5b, 5c and 5d show views of a fifth embodiment of a blind rivet nut; and FIGS. 6a, 6b, 6c and 6d show views of a sixth embodiment of a blind rivet nut.

DETAILED DESCRIPTION

Figure 4A:
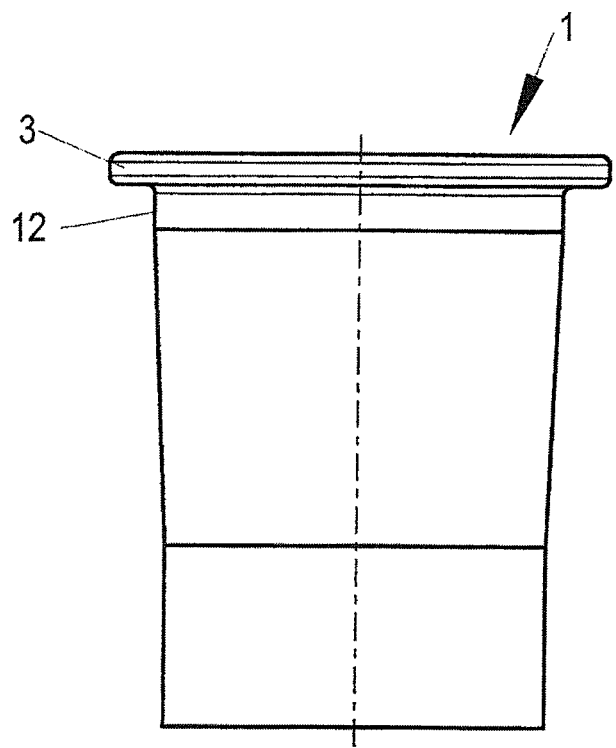
FIGS. 4a, 4b and 4c show views of a fourth embodiment of a blind rivet nut.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Identical and correlating elements are provided with the same reference numerals in all Figures. The drawing should not be considered as being to scale.

FIGS. 1a and 1b show a blind rivet nut 1 in a side view and in a sectional view, respectively.

The blind rivet nut 1 comprises a rivet sleeve 2 which comprises a set head 3, a deformation region 4, and a threaded section 5 having a female thread 6. The female thread 6 comprises maximally four complete thread turns. Preferably, the female thread 6 comprises maximally three complete thread turns.

When setting a blind rivet nut of this type, the rivet sleeve 2 is guided through a bore in a workpiece or an item that is to be joined, until the set head 3 bears against the workpiece or the item that is to be joined. A pulling mandrel screwed beforehand into the female thread 6 is then loaded with a pulling force so that the threaded section 5 is moved towards the set head 3. As a result, the deformation region 4 bulges radially outwards and forms a closing head in a manner known per se.

Because the female thread 6 comprises maximally four complete thread turns, the threaded section 5 can be kept relatively short in a direction parallel to a thread axis 7. The threaded section 5 can therefore be formed using relatively little material, so that the mass of the blind rivet nut 1 can be minimized.

At least the set head 3 and/or the deformation region 4 of rivet sleeve 2, and in embodiments blind rivet nut 1, is formed from a material or comprises a material for which the ratio between the elastic limit and the elongation at break is at least 10%, preferably at least 12%. This material thus forms a high-strength material that can be heavily loaded. With the same load requirements, material can be reduced by embodying the set head 3, the wall of the deformation section 4 or the wall of the threaded section 5 to be relatively thin. A blind rivet 1 with a low mass thus results overall.

FIGS. 2a and 2b show a modified, second embodiment of a blind rivet nut 1 (FIG. 2a in a side view, FIG. 2b in a sectional view) which differs from the embodiment according to FIGS. 1a and 1b in that the rivet sleeve 2 has at least two different wall thicknesses between the set head 3 and the threaded section 5. In this exemplary embodiment, the deformation section 4 has a smaller wall thickness in a section 8 adjacent to the set head 3 than in a section 9 adjacent to the threaded section 5. When the blind rivet nut 1 is set, the section 8 adjacent to the set head 3 is at least partially surrounded by the item that is to be joined, so that this section 8 is stabilized by the item that is to be joined. The section 9 adjacent to the threaded section 5 forms the closing head. Apart from that, this blind rivet nut 1 has the same properties and features as the blind rivet nut 1 described in connection with FIGS. 1a and 1b.

FIGS. 3a and 3b show a third embodiment of a blind rivet nut 1 (FIG. 3a in a side view, FIG. 3b in a sectional view) in which in a section between the set head 3 and the threaded section 5, the rivet sleeve 2 comprises an outer circumferential wall 10 that tapers towards the threaded section 5. In the embodiment according to FIGS. 3a and 3b, the outer circumferential wall is embodied to be conical.

The female thread 6 of the threaded section 5 has the same diameter as in the embodiments according to FIGS. 1a, 1b, 2a and 2b. However, it can be seen that the wall of the threaded section 5, which bears the female thread 6, has a smaller thickness than the wall in the embodiment according to FIGS. 1a, 1b, 2a and 2b as a result of the tapering shape of the rivet sleeve 2.

In this embodiment according to FIGS. 3a and 3b, the rivet sleeve 2 also has a smaller wall thickness adjacent to the set head 3 than adjacent to the threaded section 5.

In the following exemplary embodiment, between the set head 3 and the threaded section 5, the rivet sleeve 2 comprises an inner circumferential wall 11 that tapers towards the threaded section 5. An angle between the inner circumferential wall 11 and the thread axis 7 is thereby larger than an angle of the outer circumferential wall 10 to the thread axis 7, so that the wall thickness of the rivet sleeve 2 continuously increases from the set head 3 in the direction towards the threaded section 5.

Directly on the set head 3, a cylindrical section 12 can be provided which, during the setting of the blind rivet nut 1, is then surrounded by the item that is to be joined. The axial length of the cylindrical section 12 depends on the lower boundary of the clamping region of the blind rivet 1.

Figure 4B:
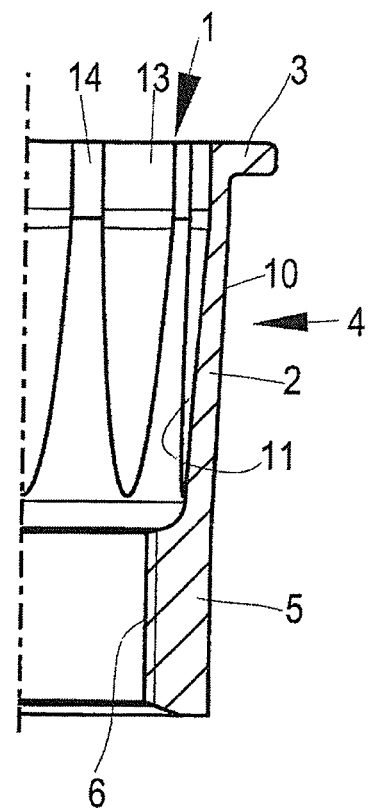
Figure 4C:
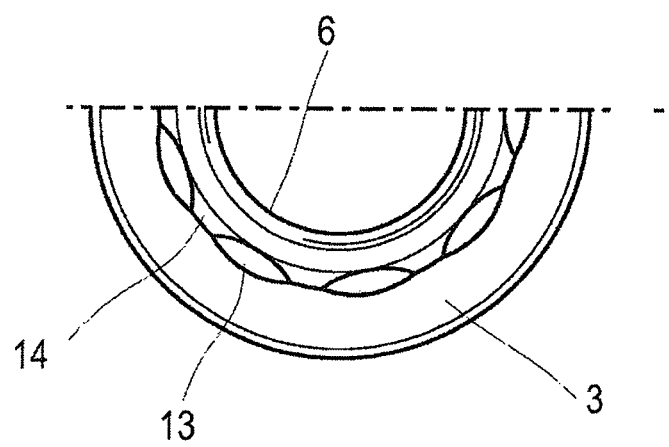

FIGS. 4a, 4b and 4c show a fourth embodiment of a blind rivet nut 1. From the outside, this blind rivet nut 1 corresponds to the blind rivet nut illustrated in FIG. 3a. FIG. 4a shows a side view, FIG. 4b shows a sectional view of a half, and FIG. 4c shows a top view. The embodiment according to FIGS. 4a, 4b and 4c differs from the embodiment according to FIGS. 3a and 3b in that the rivet sleeve 2 comprises protrusions 13 and troughs 14 (or depressions) on the inner circumferential wall thereof. The protrusions 13 and troughs 14 alternate in a circumferential direction. The protrusions 13 and troughs 14 are located roughly on a circular line. The main direction of the protrusions 13 and the troughs 14 runs parallel to the thread axis 7.

FIGS. 5a, 5b, 5c and 5d show a fifth embodiment of a blind rivet nut 1. In this embodiment, FIG. 5a shows a side view, FIG. 5b a sectional view, FIG. 5c a bottom view and FIG. 5d an enlarged illustration of the detail X shown in FIG. 5c.

The embodiment according to FIGS. 5a, 5b, 5c and 5d differs from the embodiment according to FIGS. 3a and 3b in that the threaded section 5 comprises at the outer circumference thereof a shape that deviates from a cylinder shape or cone shape.

In the present exemplary embodiment, the threaded section 5 comprises at the outer circumference thereof a shape in which protrusions 13 and troughs 14 alternate in a circumferential direction roughly on a circular line. The protrusions 13 and the troughs 14 run parallel to the thread axis 7. The shape of the threaded section 5 can thus be easily produced.

The troughs 14 can also be deeper than as illustrated in the figures.

There are multiple possibilities for producing the shape. In embodiments, the troughs 14 can be produced by removal of material at this position. The removed material reduces the mass of the blind rivet nut 1.

In an alternative embodiment, the wall of the threaded section 5 is compressed, and thus strengthened, in the region of the troughs 14. Apart from that, the wall thickness of the threaded section 5 can be further reduced due to the increased strength.

FIGS. 6a, 6b, 6c and 6d show a sixth embodiment of a blind rivet nut 1. FIG. 6a shows a side view, FIG. 6b shows a sectional view, FIG. 6c shows a bottom view, and FIG. 6d shows a detail Z from FIG. 5c in an enlarged illustration.

In this embodiment, the shape of outer surface of the threaded section 5, which deviates from a cylinder shape or cone shape, continues into the deformation region 4, that is, in the direction towards the set head 3.

Here, the protrusions 13 transition from the threaded section 5 into the deformation section 4 with a curve 15, whereas the troughs 14 transition from the threaded section 5 into the deformation section 4 with an edge 16.

The formation of the protrusions 13 and troughs 14 which was described in connection with the blind rivet nut according to FIGS. 5a, 5b, 5c and 5d can be used in the same way for the formation of the blind rivet nuts 1 that are described in connection with FIGS. 4a, 4b, 4c, 6a, 6b, 6c and 6d.

In the exemplary embodiments, the female thread 6 comprises a "thread error." In this regard, the pitch of the female thread deviates from the pitch of a corresponding standard thread by 2%. This leads to an element with a male thread that, when screwed into the female thread 6, is tensioned against the female thread 6 so that the thread turns of the female thread 6 are involved to a great extent uniformly in bearing the load. The loading of the threaded section 5 is thus relatively uniform in a direction parallel to the thread axis, and peak loads for which the threaded section 5 would then have to be sized are avoided. Overall, the threaded section 5 can thus be sized using little material, and therefore to be relatively weak, so that the mass of the blind rivet 1 can be minimized.

In the embodiments, it can be provided that the set head and/or the deformation region, which has been transformed into the closing head, have a relative strength that is greater than a thread pull-out force of the female thread. This relative strength should preferably be maximally 50% higher, in particular maximally 25% higher, than the thread pull-out force. It is thus in turn possible to use less material, since the set head 3 and/or the deformation region 4 that is to be formed into the closing head can be embodied to be relatively low in mass.

The blind rivet nut 1 essentially has two functions: it is intended to hold together two or more elements of an item that is to be joined and it is intended to provide a female thread in order to subsequently allow additional elements to be screwed in place at this position. The relative strength and the thread pull-out force are then coordinated with one another such that, in the event of a failure of the thread, the first function, namely the joining, is still satisfied.

It is noted that the foregoing examples have been provided merely for the purpose of explanation and are in no way to be construed as limiting of the present invention. While the present invention has been described with reference to an exemplary embodiment, it is understood that the words which have been used herein are words, of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A blind rivet nut comprising:
   a rivet sleeve having a set head, a deformation region for forming a closing head, and a threaded section having a female thread,
   wherein the female thread comprises maximally four complete thread turns, and
   wherein at least one of the set head and the deformation region, which has been transformed into the closing head, has a relative strength that is greater than a thread pull-out force of the female thread.

2. The blind rivet nut according to claim 1, wherein the relative strength is maximally 50% higher than the thread pull-out force.

3. The blind rivet nut according to claim 2, wherein the relative strength is maximally 25% higher than the thread pull-out force.

4. The blind rivet nut according to claim 1, wherein the rivet sleeve, at least in a region of at least one of the set head and the deformation region, is comprised of a material for which a ratio between an elastic limit and an elongation at break is at least 10%.

5. The blind rivet nut according to claim 4, wherein the ratio between the elastic limit and the elongation at break is at least 12%.

6. The blind rivet nut according to claim 1, wherein the female thread has a pitch that differs from a pitch of a standard thread by at least 2%.

7. The blind rivet nut according to claim 1, wherein the rivet sleeve has at least two different wall thicknesses between the set head and the threaded section.

8. The blind rivet nut according to claim 7, wherein a wall thickness of the rivet sleeve is a smaller adjacent to the set head than adjacent to the threaded section.

9. The blind rivet nut according to claim 1, wherein in a section between the set head and the threaded section, the rivet sleeve comprises an outer circumferential wall that tapers towards the threaded section.

10. The blind rivet nut according to claim 9, wherein in a section between the set head and the threaded section, the rivet sleeve comprises an inner circumferential wall that tapers towards the threaded section.

11. The blind rivet nut according to claim 10, wherein the outer circumferential wall has a smaller angle to an axis of the female thread than does the inner circumferential wall.

12. The blind rivet nut according to claim 1, wherein the rivet sleeve has an inner circumference wall and an outer circumference wall, and wherein at least one of the inner and outer circumference wall has a shape that deviates from a cylinder shape or cone shape.

13. The blind rivet nut according to claim 12, wherein the deviating shape is provided on the threaded section.

14. The blind rivet nut according to claim 12, wherein the deviating shape is provided on the threaded section and the deviating shape continues past the threaded section in the direction of the set head.

15. The blind rivet nut according to claim 12, wherein the shape comprises protrusions and troughs that run parallel to an axis of the female thread.

16. The blind rivet nut according to claim 15, wherein the protrusions transition from the threaded section into the deformation section with a curve.

17. A method forming a blind rivet nut that includes a rivet sleeve having a set head and a threaded section separated by a deformation region for forming a closing head, the method comprising:
    forming a female thread in the threaded section of the rivet sleeve having at most four complete thread turns, wherein at least one of the set head and the deformation region, when transformed into the closing head, has a relative strength that is greater than a thread pull-out force of the female thread.

18. The method according to claim 17, further comprising shaping at least one of at least a part of an inner circumferential wall of the rivet sleeve and at least a part of an outer circumferential wall of the rivet sleeve with protrusions and depressions extending parallel to a thread axis of the female thread.

19. The method according to claim 17, further comprising compressing a portion of an outer circumferential wall surrounding of the threaded section to form protrusions and depressions running parallel to a thread axis of the female thread.

* * * * *